Oct. 10, 1967   C. M. WALINE   3,345,935
MULTISECTIONED DISPOSABLE COFFEE BREWING BAG AND BASKET
Filed Dec. 28, 1964   4 Sheets-Sheet 1
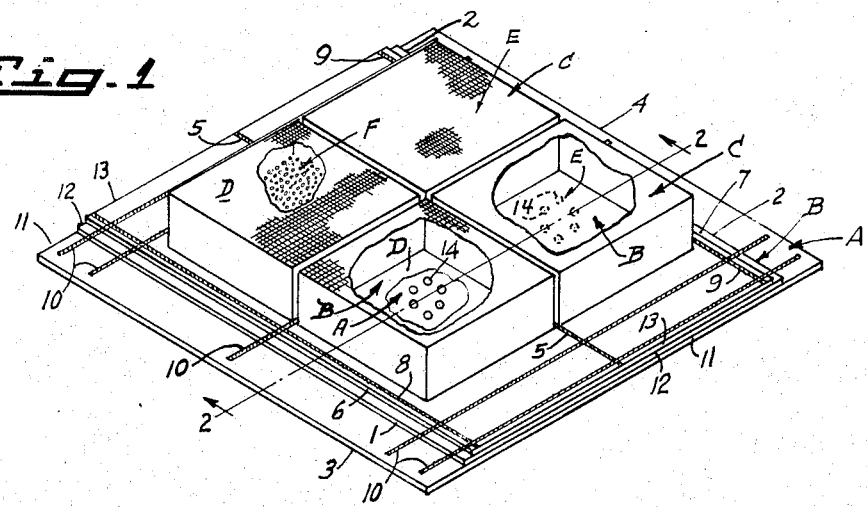
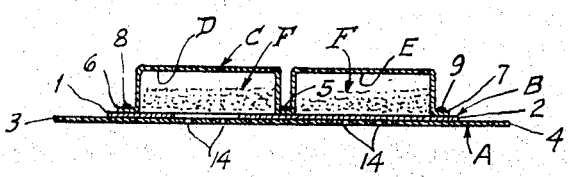
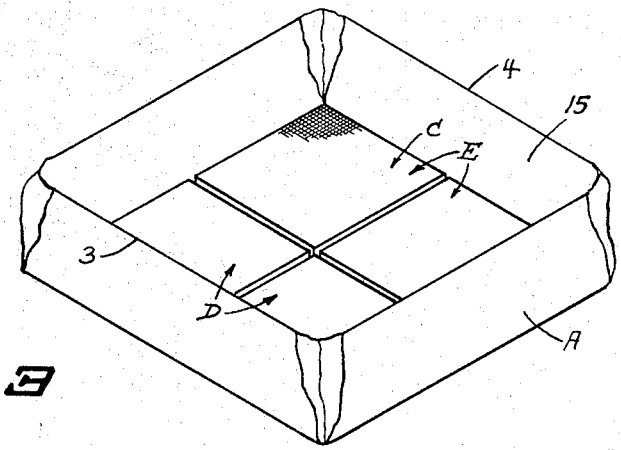
INVENTOR.
CLIFFORD M. WALINE
BY
William R. Piper
ATTORNEY Oct. 10, 1967  C. M. WALINE  3,345,935
MULTISECTIONED DISPOSABLE COFFEE BREWING BAG AND BASKET
Filed Dec. 28, 1964  4 Sheets-Sheet 3

INVENTOR.
CLIFFORD M. WALINE
BY
William R. Piper
ATTORNEY

INVENTOR.
CLIFFORD M. WALINE
BY William R. Piper
ATTORNEY

| United States Patent Office | 3,345,935
Patented Oct. 10, 1967 |
|---|---|

3,345,935
MULTISECTIONED DISPOSABLE COFFEE BREWING BAG AND BASKET
Clifford M. Waline, 3344 Rubin Drive,
Oakland, Calif. 94602
Filed Dec. 28, 1964, Ser. No. 421,190
3 Claims. (Cl. 99—295)

The present invention relates to improvements in a multisectioned disposable coffee brewing bag and basket, and they consist in the combination, construction and arrangement of parts as hereinafter described and claimed.

An object of my invention is to provide a multisectioned disposable coffee brewing bag which is an improvement over the beverage brewing bag disclosed in my Patent No. 2,716,607, issued Aug. 30, 1955. In the patent I showed a bag provided with upper and lower panels made of a material through which water could pass. The panels were stitched together to provide ground coffee receiving compartments. The outer periphery of the bag could be circular, square or rectangular. The purpose of dividing the bag into compartments was to prevent the bunching of the ground coffee or other ingredient contained in the bag during the normal handling of the bag.

The present invention is designed to provide a disposable bag for holding coffee and the like in which novel means is used for retaining the hot water in the bag for an appreciable length of time so that the hot water will be in contact with the coffee for a period of time that will make the best brewed coffee. I also provide a coffee brewing basket in which the disposable bag for coffee can be placed. This basket is of novel construction and it will hold the sides of the coffee bag in a vertical direction so as to form a water retaining reservoir that will hold the hot water while permitting it to gradually seep through the filter material and come into contact with the coffee and then flow out through an opening in the bottom of the basket.

Both the disposable coffee brewing bag and the basket are simple in construction.

Other objects and advantages will appear as the specification continues. The novel features of the invention will be set forth in the appended claims.

*Drawings*

For a better understanding of my invention, reference should be made to the accompanying drawings, forming part of this specification, in which:

FIGURE 1 is an isometric view of the coffee brewing bag, portions being broken away for clarity.

FIGURE 2 is a transverse section taken along the line 2—2 of FIGURE 1.

FIGURE 3 is an isometric view of the coffee brewing bag with the sides of the bag extending vertically.

Figure 4:
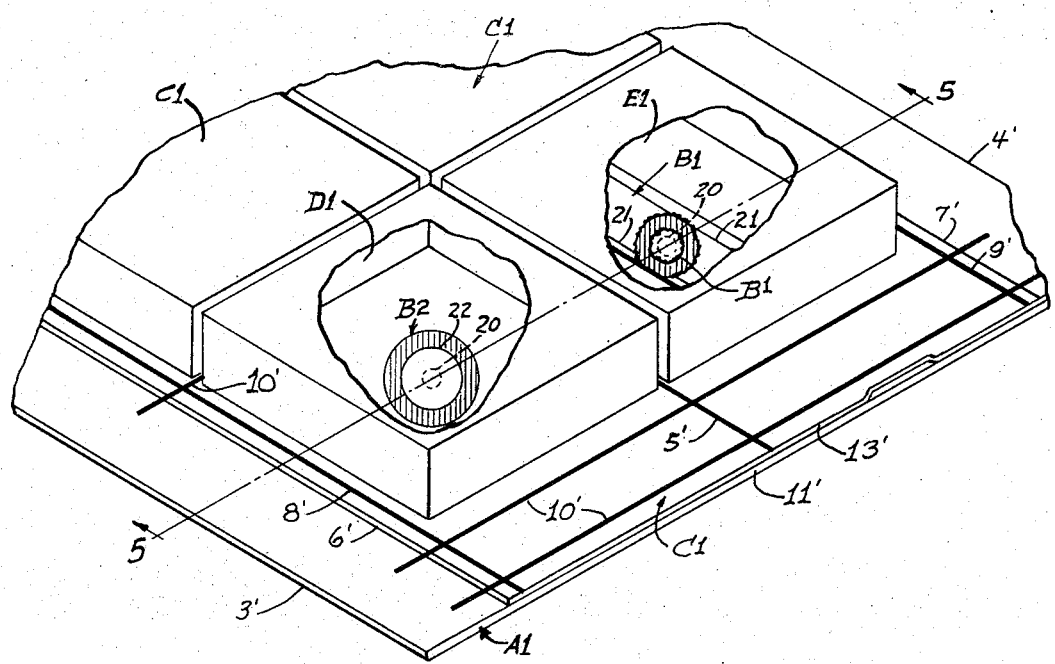
FIGURE 4 is an isometric view of a modified form of the coffee brewing bag with portions being broken away for clarity.

While I have shown only the preferred forms of my invention, it should be understood that various changes, or modifications, may be made within the scope of the annexed claims without departing from the spirit thereof.

*Detailed description*

In carrying out my invention, I will first described the two forms of multi-sectioned disposable coffee bags and then will describe the brewing basket and set forth how the bag is supported in it. In FIGURE 1, I show an isometric view of the coffee bag and it will be noted that I provide a flat bottom layer A that is impervious to water and is preferably a sheet of sealable polyester film similar to the 3M "Scotch-Pak" 20A5. This sheet may be of any size desired and I have found that for the commercial brewing of coffee it should be twelve inches square. However, I do not wish to be confined to any exact measurements.

I then take a second sheet B of filter type material and place this on the first sheet A. It will be noted that the edges 1 and 2 of the filter sheet B are spaced inwardly from the edges 3 and 4 of the impervious bottom sheet A. I have designed the coffee bag so that it can be made by a machine in which the impervious bottom sheet A is fed from a roll and the width of the sheet is twelve inches. The sheet B of the filter type material is also fed from a roll and the width of this sheet is preferably ten inches. It is for this reason that the edges 1 and 2 of the sheet B are spaced inwardly from edges 3 and 4 of the impervious sheet A a distance of about one inch although I do not wish to be confined to this exact measurement.

A top sheet of material indicated generally at C is made of a filter type material and this sheet is formed into a plurality of coffee retaining sections. Again referring to FIGURES 1 and 2, it will be seen that the top sheet C has its center portion heat-sealed at 5 to the sheets A and B. The heat sealing is done by a heated member, not shown, that will press the center of the sheet C down against the filter sheet B and cause the latter to be pressed against the impervious bottom layer A. Since the bottom layer A is made of a heat-sealable polyester film, the heated member pressed against the sheet C at the point 5 will melt the polyester film A at this point sufficiently to cause both the sheets B and C to adhere to the bottom layer A along the sealing line 5.

The top sheet C is then formed into two cavities D and E, see FIGURE 2, and the outer edges 6 and 7 are heat-sealed along the heat lines 8 and 9 to the layers A and B. Since the coffee bags are to be made in a continuous manner, the heat-sealing lines 8 and 9 will be continuous and will parallel the central heat-sealing line 5. The top layer C is also sealed to the layers A and B by transversely extending heat-sealing lines 10 that are spaced from each other, see FIGURE 1. These transversely extending heat-sealing lines 10 provide transverse boundary walls for the cavities D and E with the result that two rows of coffee receiving cavities D and E are provided. These cavities are not completely filled with ground coffee F because the coffee will swell when hot water is caused to flow therethrough during the coffee brewing process. Although I have shown only two rows of cavities D and E it is possible to provide additional rows. In the form shown in FIGURE 1, each coffee retaining cavity is four inches square and is about three-fourths of an inch deep. The base layer A and the filter layer B are cut along the lines 11 and 12 and the upper layer C is cut along the line 13 to form a single bag having four cavities and holding ground coffee.

Figure 8:
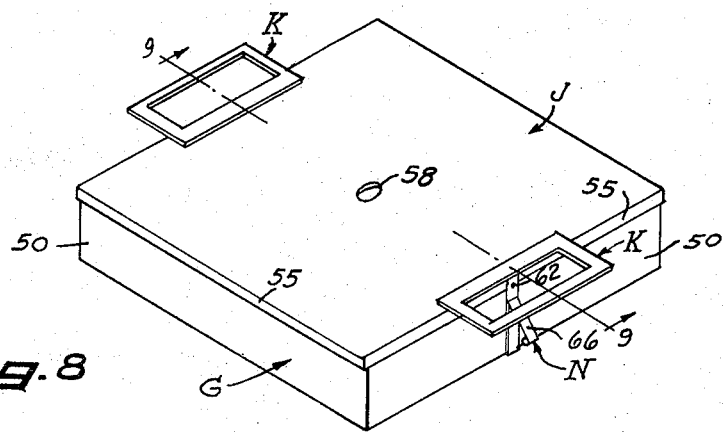
FIGURE 8 is an isometric view of the coffee brewing basket.

In FIGURE 2, I show the bottom layer A provided with a plurality of holes 14 and these are preferably arranged near the centers of the coffee receiving cavities D and E, see FIGURE 1. When hot water is poured over the top filter layer C in the manner hereinafter described, it will flow through the top layer and then pass through the ground coffee and finally flow out through the groups of holes 14. I will describe hereinafter how the sides of the lower layer A that extend beyond the coffee-receiving sections D and E can be turned upwardly to form a water retaining reservoir 15 as shown in FIGURE 3, and how the sides A are held in an upright position by the brewing basket shown in FIGURES 6, 7 and 8.

Figure 5:
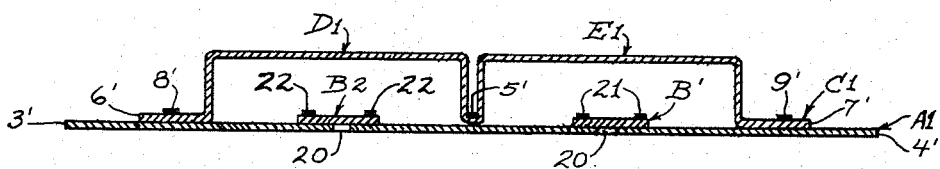
FIGURE 5 is a transverse section taken along the line 5—5 of FIGURE 4.

I will now describe a modified form of the multi-sectioned disposable coffee bag and this is shown in FIGURES 4 and 5. The impervious lower layer A1 is the same as the layer A. The lower filter layer B is not used in the modified form but the top layer C1 of filter material is used and is the same as the top layer C of the preferred form. The top layer C1 is heat-sealed directly to the bottom layer A1 by the same lines of heat-sealing as in the preferred form. Like reference numerals will therefore be used as in the preferred form but in the modified form these reference numerals will be primed.

The coffee-receiving compartments or cavities D1 and E1 will be the same as the cavities D and E shown in the preferred form. Instead of the plurality of openings 14 for each cavity or coffee-retaining section as shown in the preferred form, I provide a single opening 20 for each cavity. This opening 20 in the cavity E' may be closed by a narrow filter strip B1 and this strip is heat-sealed along the lines 21. The filter strip B1 is shown broken away in a circular portion that is indicated by parallel shade lines in FIGURE 4. Then the opening 20 in the compartment E1 is shown covered by a circular portion of the strip B1.

In the cavity D1, the central opening 20 may be covered by a circular or disc-shaped filter strip B2 and this may be heat-sealed to the bottom layer A1 by a circular heat-sealing line indicated at 22. The circular area between the periphery of the filter disc B2 and the circular heat-sealing line 22 has been shown covered by parallel shade lines in order to distinguish the disc B2 from the bottom sheet A1.

In all other respects the modified form of the disposable coffee-retaining bag is the same as the preferred form and no further description need be given.

Figure 6:
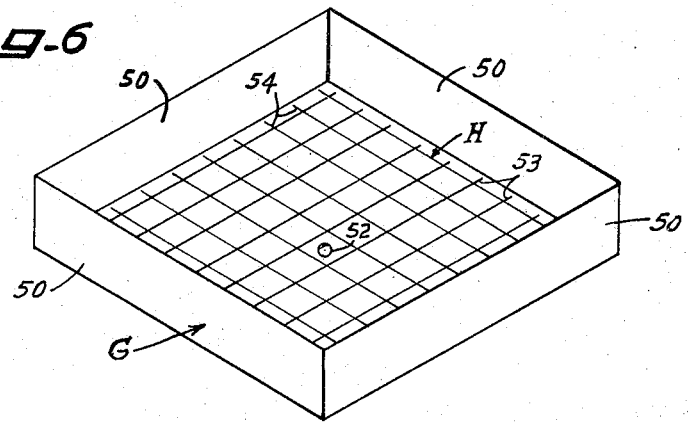
FIGURE 6 is an isometric view of the receptacle that forms a part of the basket holding the disposable coffee brewing bag.

In FIGURES 6 to 10 inclusive, I show a coffee-brewing basket which is especially designed for holding my disposable coffee bag. This basket will support the sides of the coffee bag in a raised position so as to form the water retaining reservoir 15, shown in FIGURE 3. The receptacle portion G of the basket is shown in FIGURE 6 and it is in the shape of a square box that may be made of metal or plastic. The thickness of the metal for the receptacle G is shown by a single line in this figure. The basket has four side walls 50 and these walls are two and one-half inches high and eight inches long so as to receive the disposable coffee bag shown in FIGURE 3. The bottom 51 has a central opening 52 for the brewed coffee to pass therethrough and the portions of the bottom wall from this central opening will slope upwardly as clearly shown in FIGURE 9. The purpose of this sloping bottom is to prevent the brewed coffee from collecting in the corners of the receptacle G. Furthermore the downwardly inclined bottom wall portions will strengthen the bottom of the receptacle.

Figure 9:
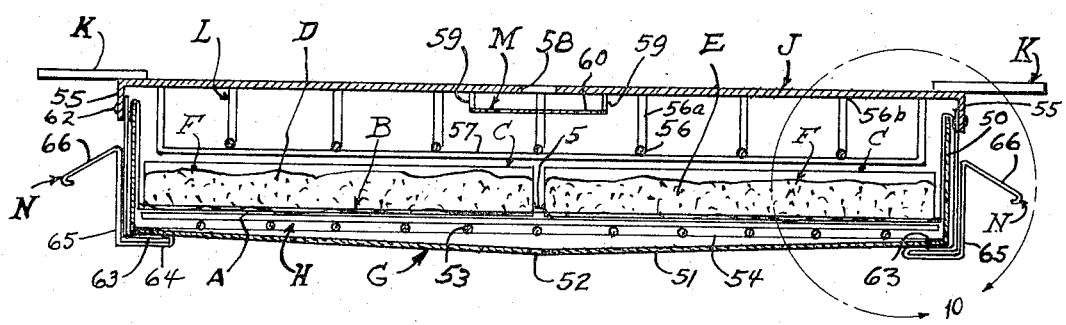
FIGURE 9 is a transverse section through the basket shown in FIGURE 8 and is taken along the line 9—9 of FIGURE 8, the basket being shown on a large scale.

A wire rack H extends across the bottom of the receptacle G, and this rack comprises a group of parallel wires 53 that are spaced from each other and they extend at right angles to a second group of spaced apart parallel wires 54, see FIGURE 6. Where the wires 53 cross the wires 54, they are connected together by welding or the like. The wire rack H will therefore have a plurality of square areas formed by the two sets of wires 53 and 54 that are disposed at right angles to each other. The two sets of wires may be interwoven like a screen mesh, as shown in FIGURE 9, or the set of wires 53 may be placed under the upper set 54 as shown in detail in FIGURE 10. It will be seen from FIGURE 9, that the central portion of the wire rack H is spaced above the center of the bottom 51 so as to permit the brewed coffee to flow by gravity along the downwardly inclined portions of the bottom wall and then pass through the central opening 52.

My disposable coffee bag is placed in the receptacle G and is supported by the wire rack H. The portions of the flat bottom layer A or A1 of the coffee bag that project beyond the coffee retaining portions D and E or D1 and E1, will extend upwardly along the inner surfaces of the four side walls 50 and these will form two sides of the water-retaining reservoir 15. It will also be noted that the transverse edges 11 and 11' for the bottom layers A or A1, provide transversely extending portions that project beyond the coffee retaining receptacles D and E or D1 and E1 and these portions will be bent upwardly along the other two side walls 50 of the receptacle. Therefore all four side walls of the coffee bag will be held in a vertical position to form the water-retaining reservoir 15. In addition these four upwardly projecting portions that surround the coffee-retaining cavities D and E or D1 and E1 will project beyond the upper edges of the side walls 50 and then will extend downwardly along the outer surfaces of these walls as shown at 15a in FIGURE 10.

I will now describe the particular construction of a cover J that is provided for the receptacle G. This cover is square and has downwardly extending side flanges 55 that will receive the upper portions of the four side walls 50 of the receptacle G. The cover is further provided with two handles K and these lie flush with the top of the cover and extend beyond opposite sides thereof.

Figure 7:
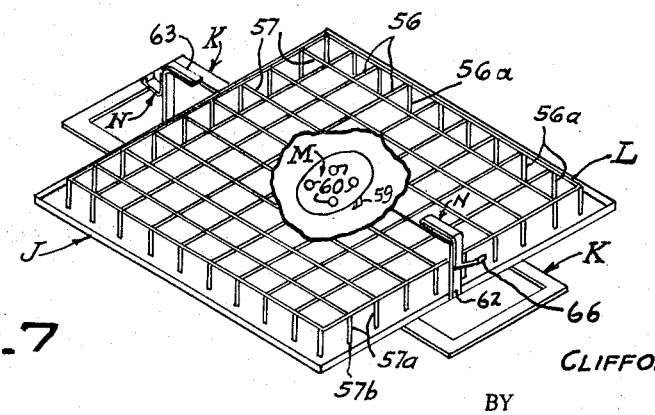
FIGURE 7 is an isometric view of the cover for the basket, the cover being shown in inverted position with portions being broken away for clarity.

The inside of the cover J is provided with a fixed wire rack L, see FIGURE 7. The rack L is formed from a plurality of parallel wires 56 that are spaced from each other and these wires intersect a second group of parallel wires 57 that are also spaced from each other. The wires 56 extend at right angles to the wires 57. It will be seen from FIGURE 10, that the ends of the wires 56 are bent at right angles as at 56a and then these ends are spot welded to the inner surface of the cover J as at 56b. The wires 57 have their end portions bent at right angles as at 57a and the extremities of these ends are spot welded to the inner surface of the cover J as at 57b.

The purpose of the fixed wire rack L is to contact with the top of the coffee brewing bag when the cover J is placed over the receptacle G and to hold the coffee bag from floating upwardly in the hot water received in the coffee brewing basket. In this way the coffee bag is kept submerged in the hot water during the entire brewing of the coffee. The center of the cover J has a hot water entrance opening 58, see FIGURE 8. I dispose a small water spreader M directly below the central opening 58 in the cover and this spreader is held in place by a plurality of posts 59, see FIGURE 9. The water spreader M has a plurality of openings 60 which will permit water to pass therethrough for contacting with portions of the coffee bag that are disposed near the center of the basket. The hot water can also flow between the spreader M and the inner surface of the cover J and will pour over the circular edge of the spreader. It will therefore be seen that hot water poured upon the cover J will be metered into the receptacle G through the central opening 58. The hot water is prevented from concentrating its force at the center of the coffee bag and this is accomplished by the small disc-shaped spreader M having the opening 60. The hot water will therefore flow over all of the coffee containing pockets or cavities D and E or D1 and E1.

Figure 10:
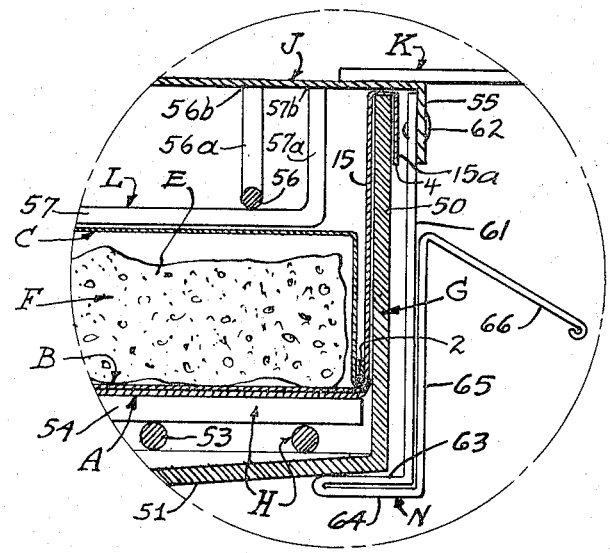
FIGURE 10 is an enlarged detail of the circled portion 10 shown in FIGURE 9.

Due to the smallness of the scale of FIGURE 9, the disposable coffee bag is shown with its bottom layer A, the next layer B, and the top layer C, by single lines rather than showing thickness of these layers. FIGURE 10 is an enlarged detail of the circled portion 10 in FIGURE 9. The various layers of material of the coffee bag shown in FIGURE 10, are sectioned. In FIGURE 7, the central portion of the fixed wire rack L, has been broken away in order to show the disc-shaped water spreader M with its openings 60 and its supporting legs 59.

I provide spring clips indicated generally at N for removably securing the cover J to the basket G. Two of these spring clips are used and each one is placed near one of the handles K. A description of one of the spring clips will suffice for both. The spring clip is formed from a flat strip of metal 61, see FIGURE 10, and the upper end of this strip is secured to the inner surface of the cover flange 55 by rivets 62. The strip 61 is bent inwardly at right angles to form a hook portion 63. The strip is then bent back upon itself at 64 to provide additional strength for the hook 63. This strip 61 is again bent at right angles at 65 and this portion of the strip parallels the first mentioned strip portions 61. An integral handle 66 is bent at an angle to the upwardly extending portion 65 and FIGURE 9, shows that this handle is positioned near to the cover handle K.

When the cover J is placed over the receptacle G, the operator grasps the cover handles K with two hands and then uses his fingers for engaging with the spring clip handles 66 for swinging these handles toward the cover handles K. This movement will swing the spring-clip hooks 63 outwardly so that these hooks will clear the outer surface of two of the opposite side walls 50 of the receptacle G. As soon as the hooks 63 clear the upper edges of the opposed walls 50, the operator frees the spring clip handles 66 and the flexibility of the clips will cause their inner ends or hooks 63 to move downwardly over the outer surface of the receptacle sides 50 and then when they reach the bottom 51 of the receptacle, they will move inwardly for removably clamping the cover J to the receptacle G, see FIGURE 10.

*Operation*

From the foregoing description of the disposable coffee bag and the brewing basket, the operation thereof may be readily understood. The cover J of the basket, is removed from the receptacle G and then the coffee bag of the type shown in FIGURES 1 and 4, is placed in the receptacle and will be supported by the wire rack H. The sides of the coffee bag will extend upwardly along the inner surfaces of the sides 50 of the receptacle G and the coffee bag sides will have sufficient length to extend over the upper edges of the receptacle side walls 50 and then to extend downwardly along the outer surfaces thereof.

The cover J is now placed over the receptacle G in the manner already described, the operator taking care that the spring clips N are swung outwardly during this movement and then the clips are released for securing the cover to the box when the cover is fully in place. The four flanges 55 of the cover will contact with the portions of the sides of the coffee bag that extend over the upper edges of the receptacle sides 50 and will aid in holding the sides of the coffee bag in a vertical position for providing the water retaining reservoir 15.

The coffee brewing basket is now placed in the coffee brewer, not shown, and the brewing basket will be supported in any well known manner, none being shown. Hot water is now poured onto the top of the cover J and will flow through the central opening 58 in the cover and then be deflected throughout the entire interior of the brewing basket by the small hot water deflector M. The water retaining reservoir 15 is large enough in capacity to hold a quantity of hot water that will submerge the coffee-containing receptacles or cavities D and E or D1 and E1, and brew coffee from the coffee grounds F. The brewed coffee will then flow through the openings in the bottom layer A of the coffee bag and will pass through the wire rack H and be guided toward the central opening 52 in the bottom 51 of the receptacle. In this way the hot water will pass through the coffee bag once but it will be retained around the coffee grounds for a long enough period so that coffee of the proper strength will be brewed. The central opening 52 delivers the coffee to the coffee brewer, not shown.

The improved bag is designed to give a "controlled flow" of water through each section of the disposable coffee bag. It is unique in the fact that a top layer of filter type material C is combined with an impervious material A on the bottom. This combination will give complete contact between the ground coffee and the water by two methods:

(1) A full coverage of water over the coffee grounds F from the top through the filter paper C.

(2) A routing of the flow of water through each section D and E, thereby forcing the water to converge from a large top area C to a small one in the center bottom layer A of each section. This prevents a leaking of water from the edges of each section where no contact is made between the water and the ground coffee.

Note: The extension of the bottom layer A to enlarge the capacity of the hot water retaining reservoir 15, increases the efficiency of this feature. A complete flushing of hot water through each section D and E, takes place. The results are a greater extraction of soluble solids from the ground coffee.

I claim:
1. A coffee brewing bag comprising:
  (a) a flexible bottom layer impervious to water;
  (b) a top layer of filter material formed into a plurality of coffee-holding compartments, the sides of said compartments being connected to said bottom layer;
  (c) said bottom layer having at least one filter-covered opening communicating with the central portion of each compartment for permitting brewed coffee to pass therethrough but preventing the passage of coffee grounds; and
  (d) said bottom layer extending beyond said compartments for forming an upstanding flexible border that surrounds said compartments to form a hot water holding reservoir that will cause the water to uniformly cover all of the compartments at the start of the coffee brewing period.
2. In combination:
  (a) a coffee brewing bag having a plurality of compartments for holding coffee and permitting hot water to seep through the compartments for producing brewed coffee;
  (b) said bag having a border of flexible material surrounding said compartment;
  (c) a coffee brewing basket for receiving said bag and having side walls for holding the flexible border of said bag in an upright position for causing this border to cooperate with said coffee holding compartments for retaining the hot water poured into said basket and causing all of the water to seep through said compartments;
  (d) said coffee brewing basket being composed of a receptacle for receiving the coffee bag; the border of said bag being impervious to water and extending upwardly on the inner surfaces of said receptacle side walls and extending over the tops of these walls;
  (e) a cover for said receptacle and having at least one opening therein and flanges extending over said side walls and engaging with the portions of said coffee bag border projecting beyond the top of said walls for holding said portions in place; and
  (f) a wire rack carried by the cover and holding the coffee bag from floating in the water temporarily held by the raised border of said bag.
3. In combination:

(a) a coffee brewing bag having a plurality of coffee-holding compartments covering the bottom of the bag, said bag including a hot water retaining reservoir having sides extending above said compartments so that the body of hot water in the reservoir will extend at a uniform depth over all of the compartments; and (b) a coffee brewing basket for supporting said bag and receiving all the brewed coffee dispensed by said bag;

(c) said basket having an outlet opening for permitting the brewed coffee to pass therethrough slowly;

(d) whereby the slow flow of brewed coffee through said outlet opening will restrain the remaining body of water in said basket and in said water-retaining reservoir for a protracted period of time so as to keep the coffee in the compartment immersed in hot water for the duration of the coffee-brewing period, the hot water in said bag passing slowly only once through the coffee containing compartment for extracting soluble solids from the coffee and making a proper coffee brew.

References Cited

UNITED STATES PATENTS

| | | | |
|---|---|---|---|
| 1,876,474 | 9/1932 | Starkey | 99—77.1 X |
| 2,109,624 | 3/1938 | Ramstedt | 99—311 |
| 2,138,358 | 11/1938 | Salfisberg | 99—77.1 |
| 2,451,195 | 10/1948 | Brown | 99—77.1 X |
| 2,547,067 | 4/1951 | Waline. | |
| 2,620,088 | 12/1952 | Tellander. | |
| 2,716,607 | 8/1955 | Waline | 99—77.1 |
| 2,822,273 | 2/1958 | Anderson | 99—77.1 |
| 2,889,049 | 6/1959 | Hauser. | |
| 3,083,100 | 3/1963 | Baran | 99—77.1 |
| 3,187,663 | 6/1965 | McLean et al. | 99—305 |

FOREIGN PATENTS

| | | |
|---|---|---|
| 586,285 | 12/1924 | France. |
| 593,208 | 10/1947 | Great Britain. |

WILLIAM I. PRICE, *Primary Examiner.*

S. P. FISHER, *Assistant Examiner.*